(No Model.)

C. WOULF.
BALING PRESS.

No. 431,958. Patented July 8, 1890.

Witnesses:
J. G. Meyers
Robert Garrett

Inventor
Charles Woulf,
By James L. Norris.
Attorney.

UNITED STATES PATENT OFFICE.

CHARLES WOULF, OF BLACK RIVER, NEW YORK.

BALING-PRESS.

SPECIFICATION forming part of Letters Patent No. 431,958, dated July 8, 1890.

Application filed November 23, 1889. Serial No. 331,344. (No model.)

*To all whom it may concern:*

Be it known that I, CHARLES WOULF, a citizen of the United States, residing at Black River, in the county of Jefferson and State of New York, have invented certain new and useful Improvements in Baling-Presses, of which the following is a full, clear, and exact specification.

This invention relates to that type of presses for baling cotton, hay, and other material wherein a pair of movable followers are caused to approach each other and thereby compress the material into a bale.

The object of my invention is to provide novel, simple, and efficient power mechanism for operating the followers and equalizing the pressure on the material. To accomplish this object my invention involves the combination or arrangement of devices and the principles of operation hereinafter described, and specified in the claims, reference being made to the accompanying drawings, in which—

Figure 1:
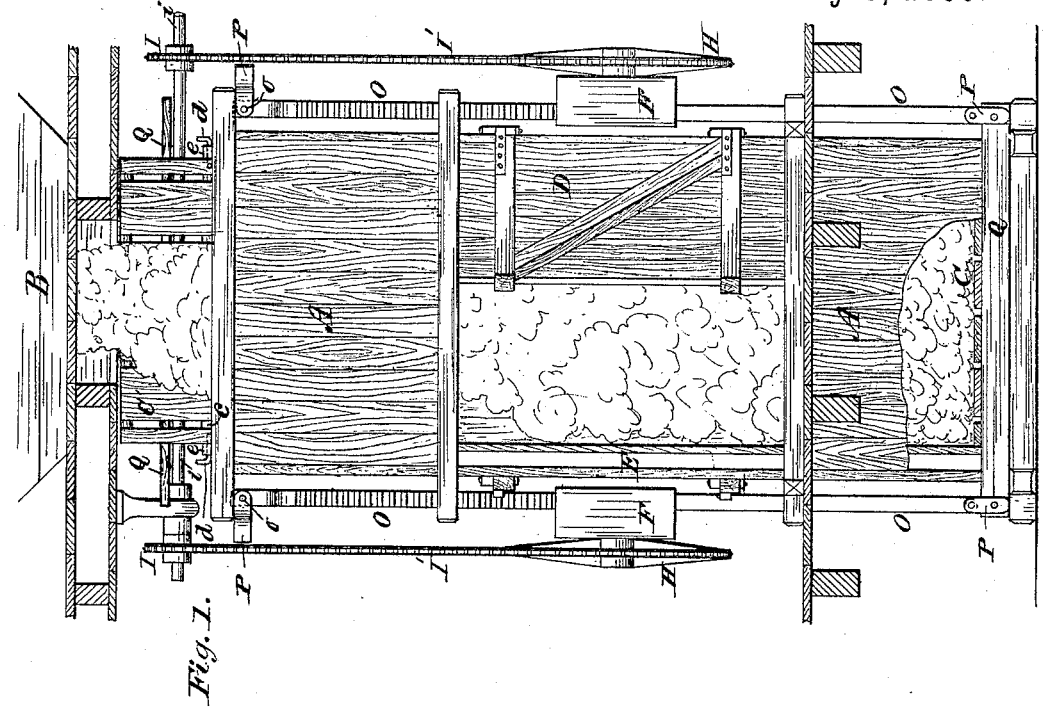
Figures 2, 3:
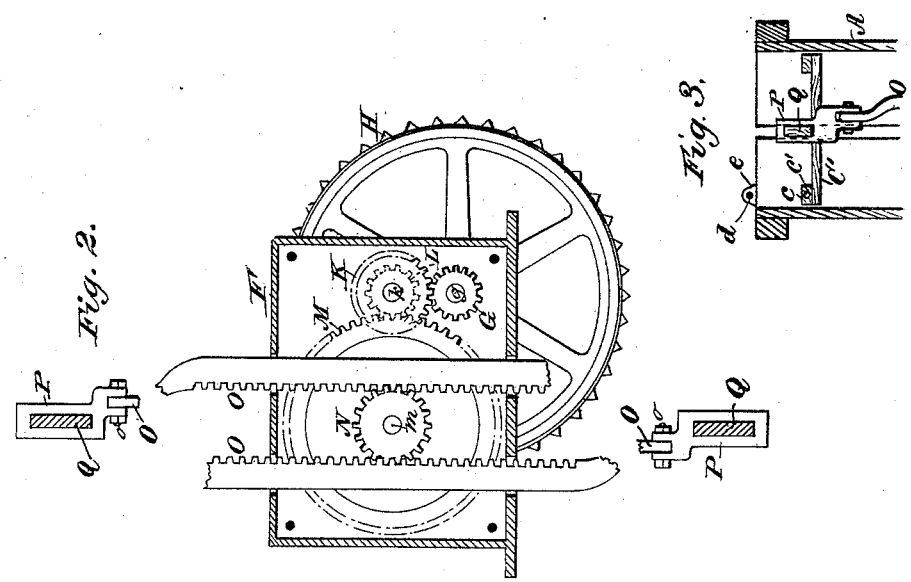

Figure 1 is a partly-sectional front elevation of a baling-press embodying my invention. Fig. 2 is a detail sectional view, on an enlarged scale, to show the power-gearing for operating the press-followers. Fig. 3 is a detail sectional view from front to rear of the upper end of the press-box.

In order to enable those skilled in the art to make and use my invention, I will now describe the same in detail, referring to the drawings, where—

The letter A indicates the press-box; B, the hopper for introducing the cotton, hay, or other material; C, the lower follower, and C' the upper follower, which is in practice so constructed that at the end or limit of its upstroke it can be swung up, as indicated in Fig. 1, to permit the introduction of the material to be pressed into bales. The press-box is provided, as usual, with opening and closing doors D and E for removing the bales, and centrally at opposite sides of the press-box are located two closed housings or casings F, one at each side, for containing the power-gearing which actuates the followers. In each housing or casing is arranged a pinion G, mounted on a shaft $g$, journaled in the casing and having on its outer end a sprocket-wheel H, which receives motion by means of the chain I' from another sprocket-wheel I on an overhanging counter-shaft $i$, driven by belts or gearing from a main shaft, by which the power is derived. The teeth of the pinion G mesh with a gear-wheel K on the shaft $k$, journaled in the sides of the casing, and to the side of this wheel a pinion L is cast or otherwise attached, its teeth meshing with a gear-wheel M, secured to the shaft $m$, also journaled in the casing.

On the shaft $m$ is firmly secured the rack engaging and actuating pinion N, whose teeth mesh with the teeth of the two vertical and parallel rack-bars O, one on each side of said pinion. These rack-bars extend through apertures in the upper and lower sides or walls of the casing F and are connected at their opposite ends to the yokes P. The ends of these yokes are forked and are connected to the ends of the racks O, which have eyes for receiving bolts $o$, and the yokes also have rectangular openings, which admit the projecting ends of horizontal cross bars or sills Q, attached to the followers.

The upper and lower ends of the rack-bars are slightly curved toward the center of the press to connect with the bent ends of the yokes, so that the central line of the strain on the followers shall be in direct line of the center of the press.

To facilitate the rectilinear movements of the racks O, I may employ friction-rollers to bear against their rear sides; but I do not deem it essential to illustrate the same. If it is desired to operate the press by hand-power instead of by a power-driven shaft, the sprocket-wheels can be dispensed with and wheels employed with suitable openings for the reception of levers or bars, as will be quite obvious.

In order to enable the upper follower C' to be raised and swung upward to one side, so as to afford a passage for feeding material into the press, such follower is provided along its rear upper surface with a bar or cleat $c$, having apertures $c'$ in its ends to receive bolts $d$, that are supported in perforated lugs $e$ on the upper portion of the press-box, as shown in Fig. 3. It will be seen that by raising the follower C' until the apertures $c'$ are brought opposite the bolts $d$ the latter can be engaged in the apertures $c'$, and will then serve as pivots or bearings on which to swing the follower $C'$ backward, the yokes P having been previously disengaged from the bar Q by swinging said yokes outward on their pivot-bolts $o$, as shown in Fig. 1. After the press has been filled the follower $C'$ is swung downward into a horizontal position, the yokes P engaged with the cross bar or sill Q, and the bolts $d$ withdrawn, so that the follower $C'$ will be free to move when the actuating mechanism of the press is put in motion.

The parts having been placed in proper position and the cotton, hay, or other material introduced into the press-box, the press-box is closed at the top, and the sprocket-wheels H, by revolving, set the intermediate gearing in motion, and thus the racks O will draw the followers toward each other, thereby compressing the material, equalizing the pressure, and relieving the bale bands or ties from strain. The closed housings or casings protect the inclosed gear-wheels and pinions from dust and dirt, and thus prevent their clogging.

The rack-bars have a long range of movement by reason of the rack-engaging pinion being revolved, and this pinion is driven by gear-connection with the shaft of the revolving external wheel, which, in connection with the housings or casings, distinguishes my invention from prior follower-actuating mechanisms, and provides means for exerting a powerful pressure on the material to be baled.

Having thus described my invention, what I claim is—

1. The combination, with a press-box, two followers movable therein, and two pairs of rack-bars located, respectively, at opposite sides of the press-box, of a pinion arranged between each pair of rack-bars, a shaft geared to each pinion and having a sprocket-wheel, a driven overhanging counter-shaft having a pair of sprocket-wheels, and chains connecting the respective sprocket-wheels, whereby the counter-shaft simultaneously and uniformly rotates the sprocket-wheels of the two pinion-carrying shafts, substantially as described.

2. The combination of the press-box having at its upper end a set of ears provided with pivot-bolts, the upper follower sliding in the press-box and having bars or cleats adapted to be temporarily engaged with the pivot-bolts to swing the follower upward, the rack-bars, of which the uppermost ones are detachably connected with the upper follower, the lower follower, and gearing for actuating the rack-bars, substantially as described.

3. The combination, with a press-box, movable followers, and two pairs of rack-bars located, respectively, at opposite sides of the press-box, of a pair of closed housings or casings, each forming a guide for a pair of the rack-bars in their rectilinear movements, gearing housed in and protected from dust and dirt by each housing, a sprocket-wheel located outside each housing or casing for operating the inclosed gearing to actuate the rack-bars and move the followers to and fro, and an overhanging counter-shaft having two sprocket-wheels and two endless chains connecting the respective sprocket-wheels, whereby the counter-shaft simultaneously and uniformly rotates the sprocket-wheels which are journaled to the two closed housings, substantially as described.

In testimony whereof I have affixed my signature in presence of two witnesses.

CHARLES WOULF.

Witnesses:
CHRISTOPHER POOR,
GEO. C. HAZELTON.